US010066148B2

(12) United States Patent
Luyster et al.

(10) Patent No.: US 10,066,148 B2
(45) Date of Patent: Sep. 4, 2018

(54) VISCOSIFIED FLUID LOSS CONTROL AGENT UTILIZING CHELATES

(75) Inventors: Mark Luyster, Houston, TX (US); Scotten Blair, Anchorage, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 13/876,962

(22) PCT Filed: Sep. 30, 2011

(86) PCT No.: PCT/US2011/054316
§ 371 (c)(1),
(2), (4) Date: Jun. 19, 2013

(87) PCT Pub. No.: WO2012/044986
PCT Pub. Date: Apr. 5, 2012

(65) Prior Publication Data
US 2013/0303412 A1   Nov. 14, 2013

Related U.S. Application Data

(60) Provisional application No. 61/388,533, filed on Sep. 30, 2010.

(51) Int. Cl.
| | | |
|---|---|---|
| *C09K 8/487* | (2006.01) | |
| *C09K 8/60* | (2006.01) | |
| *C09K 8/512* | (2006.01) | |
| *C09K 8/52* | (2006.01) | |
| *C09K 8/68* | (2006.01) | |
| *C09K 8/88* | (2006.01) | |
| *C09K 8/12* | (2006.01) | |
| *C09K 8/40* | (2006.01) | |
| *C09K 8/506* | (2006.01) | |
| *C09K 8/508* | (2006.01) | |
| *C09K 8/86* | (2006.01) | |

(52) U.S. Cl.
CPC ............. *C09K 8/60* (2013.01); *C09K 8/12* (2013.01); *C09K 8/40* (2013.01); *C09K 8/506* (2013.01); *C09K 8/508* (2013.01); *C09K 8/512* (2013.01); *C09K 8/52* (2013.01); *C09K 8/685* (2013.01); *C09K 8/86* (2013.01); *C09K 8/88* (2013.01); *C09K 8/887* (2013.01); *C09K 2208/08* (2013.01); *C09K 2208/18* (2013.01)

(58) Field of Classification Search
CPC .. C09K 2208/30; C09K 8/68; C09K 2208/26; C09K 8/467; C09K 8/512; C09K 8/52; C09K 8/685; C09K 8/887; C09K 2208/18; C09K 8/04; C09K 8/12; C09K 8/42; C09K 8/506; C09K 8/514; C09K 8/90; C09K 2208/24; C09K 3/1463; C09K 8/03; C09K 8/035; C09K 8/24; C09K 8/40; C09K 8/487; C09K 8/508; C09K 8/516; C09K 8/524; C09K 8/536; C09K 8/582; C09K 8/588; C09K 8/60; C09K 8/602; E21B 33/12; E21B 2021/005; E21B 2049/085; E21B 21/001; E21B 21/01; E21B 21/066; E21B 33/1208; E21B 33/126; E21B 36/008; E21B 41/02; E21B 43/025; E21B 43/12; E21B 43/24; E21B 43/28
See application file for complete search history.

(56) References Cited

U.S. PATENT DOCUMENTS

| | | | | |
|---|---|---|---|---|
| 6,165,947 A | * | 12/2000 | Chang | C09K 8/512 166/300 |
| 6,569,814 B1 | * | 5/2003 | Brady | C09K 8/52 507/201 |
| 6,737,385 B2 | * | 5/2004 | Todd | C09K 8/08 507/110 |
| 7,553,800 B2 | * | 6/2009 | Munoz, Jr. | C09K 8/52 166/244.1 |
| 2003/0029615 A1 | * | 2/2003 | Maberry | C09K 8/502 166/294 |
| 2007/0173418 A1 | * | 7/2007 | Munoz, Jr. | C09K 8/16 507/269 |

FOREIGN PATENT DOCUMENTS

| | | | |
|---|---|---|---|
| EP | 2199360 A1 | | 6/2010 |
| WO | 2010-053904 A2 | | 5/2010 |
| WO | WO2010/053904 | * | 5/2010 |
| WO | WO2010/056779 | * | 5/2010 |

OTHER PUBLICATIONS

N. G. Medimurec, Laboratory evaluation of calcium carbonate particle size selection for drill-in fluids, Rudarsko-geolosko-naftni zbornik, 2002, 14, 47-52.*
International Search Report for PCT Application Serial No. PCT/US2011/054316 dated Apr. 23, 2012.

* cited by examiner

*Primary Examiner* — Kumar R Bhushan
(74) *Attorney, Agent, or Firm* — David J. Smith

(57) ABSTRACT

Disclosed herein is a well treatment method comprising the steps of injecting into a well a fluid loss control agent comprising a chelating agent, a viscosity increasing agent, and a plurality of at least partially insoluble bridging solid particles dispersed therein, wherein the chelating agent is effective to at least partially solubilize at least a portion of the bridging solid particles over a solubilizing period of time for thereafter substantially dissolving the bridging solid particles, wherein the solubilizing period of time is controlled by the concentration of the viscosity increasing agent, the concentration of the chelating agent, the composition of the metal salt, the pH of the fluid loss control agent, or a combination thereof. A fluid loss control agent is also disclosed.

13 Claims, No Drawings

VISCOSIFIED FLUID LOSS CONTROL AGENT UTILIZING CHELATES

The disclosure herein relates to the treatment of oil and gas wells, more particularly to treatment methods and fluids utilizing a viscosified chelating agent with an at least partially insoluble material to form a filter cake, wherein the insoluble material after placement into the well can be solubilized downhole by the chelating agent for degradation and removal or other functional modulation in treatment of the well.

BACKGROUND

In a wide range of well and formation treatment methods it is desirable to use various materials such as bridging solids in a fluid loss pill for controlling downhole losses during operations or procedures, and then later to remove or destroy the materials, after they have fulfilled their function, to restore properties to the wellbore and/or subterranean formations such as permeability for oil and gas production, or to activate the materials or to fulfill a function such as a viscosity breaker or breaker aid.

Fluid loss control pills provide one example. When placing fluids in oilfield applications, fluid loss into the formation is a major concern. Fluid loss reduces the efficiency of the target subterranean formation and/or installed downhole completion equipment with respect to the potential to produce oil and gas. In addition time, fluid volume, and equipment can result in additional costs and compound the application. Thus, controlling fluid loss is highly desired. There are many oilfield applications in which filter cakes are needed during treatment of a wellbore. Filtercakes typically comprise an "external filter cake" and/or an "internal filter cake." The filter cake prevents or lessens fluid leak off into porous rock at a desirable rate during a well treatment. In some cases the losses may become non detectable. Such treatments include drilling, completion, workover, stimulation, hydraulic fracturing or matrix dissolution, sand control, gravel packing, slurry-packing, frac-packing, and others. Typically, once well treatment has been completed, the continued presence of the filter cake is undesirable or unacceptable. Accordingly, the filter cake must be subsequently removed to reduce the extent of formation damage and facilitate production of hydrocarbons.

Numerous methodologies have been employed to control fluid loss during well treatment. Conventional water-based drilling and completion fluids, for example, often rely on biopolymers to provide viscosity and fluid loss control. The removal process may require acids, oxidizers and/or enzymes to degrade, disperse or dissolve polymer residue and filter cake buildup. It is, for example, a common practice for drilling fluid to use sized calcium carbonate as a bridging agent, in which case an acid plus a corrosion inhibitor package may be subsequently utilized for filter cake removal to either reduce skin damage or mitigate plugging of the selected sand control screen. The overall drilling/completion strategy is based, in part, on reducing risk with respect to time, required hardware, methodology, compatibility of fluids with the hardware and reservoir, and the health, safety and environmental (HS&E) concerns.

To prevent fluid loss during well treatment, solid bridging materials may be used. Bridging materials may be essentially insoluble, sparingly soluble, or slowly soluble in the well-bore fluid. Bridging materials may also have a particular shape and hardness such that they may be malleable, and/or round to non-spherical. These fluid loss additives are subsequently incorporated as filter cake components upon dehydration of the fluid loss pill when a differential pressure is applied on a porous medium. These include soluble or at least highly dispersed components of the fluids such as biopolymers and/or crosslinked polymers. Removal of the filter cake after well treatment is typically accomplished either by a mechanical means (scraping, jetting, and/or the like), and/or by subsequent addition of a breaking agent such as an acid, a base, an oxidizer, an ester or an enzyme, which may be added to dissolve at least a portion of the filter cake. The filter cake may also be removed by manipulation of the physical state of the filter cake by e.g., by emulsion inversion. Such removal methods usually require a tool or addition of another fluid, for example, to change the pH or to add a chemical, which may be accomplished in the wellbore. However, certain well treatments including hydraulic fracturing, gravel packing, and/or the like used to stimulate the production of hydrocarbons, water and other fluids from subterranean formations may not be suitable for such an addition of another component. Furthermore, methods which require fluid flow to remove the filter cake can result in slow to incomplete filter cake removal and may even result in a plugged stratum incapable of hydrocarbon production.

Other attempts used in the art include incorporating a breaker into the filter cake, which can provide a delay before activation of the breaker to remove the filter cake, thus allowing the completion or drilling phase to continue without catastophic losses of fluid. Examples of this methodology include, for example, esterification or encapsulation of the breaker. However, such technologies are often expensive and/or difficult to place and/or difficult to trigger.

Filter cakes may be formed from a pill that uses an oil, gelled with certain additives designed for the purpose. If the pill is water or brine, a gelled polymer e.g., a polysaccharide like guar may be used as the gelling agent. The polymer may be further crosslinked with a crosslinking agent, typically a metal ion from a boron, zirconium or titanium compound. Polymer-based pills tend to form a "filter cake" whereby they dehydrate or "coat-out" on the porous face of the wellbore. The process of filter cake formation is also called wallbuilding.

However, polymers have major deficiencies which include the filter cake being left in place, which can impede subsequent flow of hydrocarbons into the wellbore, and/or polymer or crosslinked polymer being left in the strata, which may impede or cut-off flow completely. Filter cake which is not removed may physically block the flow path into the wellbore, or may leave a high viscosity fluid in the strata which impedes the flow of hydrocarbons into the wellbore.

It is also known to treat a subterranean formation by pumping a colloidal suspension of small particles in a viscoelastic surfactant fluid system; see for example U.S. Pat. No. 7,081,439, which discloses a colloidal suspension and a viscoelastic surfactant which interact to form structures that effectively bridge and block pore throats. Colloidal suspensions are typically dispersions of discrete very small particles, spherical or elongated in shape, charged so that the repulsion between similarly charged particles stabilizes the dispersion. Disturbance of the charge balance, due for instance to removing water, changing the pH or adding salt or water-miscible organic solvent, causes the colloidal particles to aggregate, resulting in the formation of a gel. These particles are typically less than 1 micron in size, and typically in the range of from about 10 to about 100 nanometers. The dispersion is prepackaged as a liquid, transparent in the case of relatively low concentrations of particles, becoming opalescent or milky at higher concentrations. In any case, the dispersion may be handled as a liquid, which greatly simplifies the dosage.

It is also known to use a hydrolysable polyester material for use as a fluid loss additive for fluid loss control. After the treatment, the fluid loss additive degrades and so contributes little damage. Further, degradation products of such materials have been shown to cause delayed breaking of polymer-viscosified fracturing fluids. U.S. Pat. No. 4,715,967 discloses the use of polyglycolic acid (PGA) as a fluid loss additive to temporarily reduce the permeability of a formation. U.S. Pat. No. 6,509,301 describes the use of acid forming compounds such as PGA as delayed breakers of surfactant-based vesicle fluids, such as those formed from the zwitterionic material lecithin. The preferred pH of these materials is above 6.5, more preferably between 7.5 and 9.5.

Issues surrounding the removal of residual skin (e.g., removal of the filter cake) after well treatment are well recognized in the literature. Residual polymers, bridging solids, and other filter cake components hinder fluid flow and may totally block the well strata. Typical remedies include use of breakers, including encapsulated breakers that may require a specific or optimized breaker loading. The breaker may be added to the fluid/slurry and is intended to remove the filter cake, reduce the viscosity of the carrier fluid and generally facilitate clean-up after well treatment.

U.S. Pat. Nos. 4,848,467 and 4,961,466 is generally directed to the use of hydroxyacetic acid and similar condensation products which naturally degrade at reservoir temperature to release acid that may be a breaker for some polymers under some conditions and which offer fluid loss control. U.S. Pat. No. 3,960,736 is generally directed to the use of esters to provide a delayed acid, which will break the fluid by attacking both the polymer and the borate crosslinks. Similarly, acid generation mechanisms are employed in U.S. Pat. Nos. 4,387,769 and 4,526,695, which suggest using an ester polymer. U.S. Pat. No. 3,868,998 also mentions acid generation. These references rely on acid, which generally has a relatively low activity as the breaker. Other breakers include oxidative breakers, which are effective for removing polymers and other filter cake components. In addition, oxidative breakers may be used for breaking zirconium and/or titanium crosslinked gels, some of which are designed to be effective viscosifiers at low pH.

In addition, "breaker aids" may be used alone or in conjunction with breakers to promote breaker activity. Breaker aids known in the art include those disclosed in, e.g., U.S. Pat. No. 4,969,526, "Non-Interfering Breaker System for Delayed Crosslinked Fracturing Fluids at Low Temperature", which is generally directed to using triethanolamine. See also U.S. Pat. No. 4,250,044. In addition, "retarding agents" or materials designed to inhibit crosslinking may be operable with both forming and cleanup of filter cake. See, e.g., U.S. Pat. No. 4,702,848, "Control of Crosslinking Reaction Rate Using Organozirconate Chelate Crosslinking Agent and Aldehyde Retarding Agent", which is generally directed to using various aldehydes for this purpose. Breakers useful to remove filter cake may further include copper ion, silver ion, or the like, which are known to function as catalysts in conjunction with various chemical breakers, dissolved oxygen, or other oxidant source, in accelerating the breaker activity.

There is a need for improved methods of placing a fluid loss control agent and removing the fluid loss control agent to restore permeability to the producing formation, especially where removal of the fluid loss control agent does not require addition of another material to initiate removal of the filter cake. Similarly, there is a need for improved methods of breaking viscosified fluid loss control agent s, especially employing a breaker or breaker aid that does not require addition of another material to activate the breaker and/or breaker aid. There is also a need for improved methods employing a fluid loss control agent or breaker that can be placed downhole in insoluble form and subsequently removed by solubilizing the insoluble material, preferably without the need for an additional material.

SUMMARY

In a first aspect of the present disclosure, a well treatment method comprises the steps of pumping or placing into a well a fluid loss control agent comprising a chelating agent, a viscosity increasing agent, and a plurality of at least partially insoluble bridging solid particles dispersed therein, wherein the chelating agent is effective to at least partially solubilize at least a portion of the bridging solid particles over a solubilizing period of time for thereafter substantially dissolving the bridging solid particles, wherein the solubilizing period of time is controlled by the concentration of the viscosity increasing agent, the concentration of the chelating agent, the composition of the metal salt, the pH of the fluid loss control agent, the use of a surfactant or a combination thereof.

In another aspect of the present disclosure, a fluid loss control agent comprises a chelating agent a viscosity increasing agent, and a plurality of at least partially insoluble bridging solid particles dispersed therein, wherein the chelating agent is effective to at least partially solubilize at least a portion of the bridging solid particles over a solubilizing period of time, and wherein the solubilizing period of time is controlled by the concentration of the viscosity increasing agent, the concentration of the chelating agent, the composition of the metal salt, the pH of the fluid loss control agent, or a combination thereof.

DETAILED DESCRIPTION

As used herein, the new numbering scheme for the Periodic Table Groups are used as in Chemical and Engineering News, 63(5), 27 (1985). Polymer may be used to refer to homopolymers, copolymers, interpolymers, terpolymers, etc. Likewise, a copolymer may refer to a polymer comprising at least two monomers, optionally with other monomers.

When a polymer is referred to as comprising a monomer, the monomer is present in the polymer in the polymerized form of the monomer or in the derivative form of the monomer.

As used herein, structural formulas are employed as is commonly understood in the chemical arts; lines ("—") used to represent associations between atoms, as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

As used herein, the term " at least partially insoluble bridging solid particles" is used to refer to various organic and inorganic salts, oxides, and the like in various insoluble physical forms, whether crystalline or amorphous, including powder, granules, beads, paste, fibers, and/or the like.

The term "well" refers to an oil well, a gas well, and/or the like.

Broadly, the present disclosure generally provides for a fluid loss control agent comprising a chelating agent a viscosity increasing agent, and a plurality of at least partially insoluble bridging solid particles dispersed therein, wherein the chelating agent is effective to at least partially solubilize at least a portion of the bridging solid particles over a solubilizing period of time, and wherein the solubilizing period of time is controlled by the concentration of the viscosity increasing agent, the concentration of the chelating agent, the composition of the bridging solid particles, the pH of the fluid loss control agent, or a combination thereof. A method of well treatment comprising the herein described fluid loss control agent is also provided for.

Chelating Agents

The fluid loss control agent according to the instant disclosure includes a chelating agent. For use herein, a chelating agent includes a chemical that forms a soluble complex molecule with certain metal or other cationic ions (e.g., ammonium ions), inactivating the ions so that they cannot normally react with other elements or ions to produce precipitates or scale. Suitable chelating agents for use herein are effective to at least partially dissolve the bridging solids of the fluid loss control agent over a period of time (a solubilizing period of time) under certain conditions including the concentration of the chelating agent in the fluid loss control agent, the concentration and/or the composition of the viscosity increasing agent utilized in the fluid loss control agent , the composition of the chelating agent or combination of agents used, the temperature of the well environment, the composition of the bridging solid particles used, the pH of the fluid loss control agent , and the like.

Suitable chelating agents for use herein are typically organic acids and salts of organic acids. When a chelating agent comprises a plurality of acid moieties, for purposes herein, salts of these acid moieties, including totally neutralized acids and partial salts wherein less than the total number of available acid moieties are in salt form (a partially neutralized acid) along with the free acid are specifically included. For brevity, chelating agents are typically listed herein as the free-acid. Unless specified, all of the possible salts of the free acid are specifically included in the recitation of the free acid form. Suitable organic acides for use herein may be selected from at least one of the following:

| | |
|---|---|
| ethylenediamine tetra acetic acid, | EDTA |
| 1,2-bis(o-aminophenoxy)ethane-N,N,N',N'-tetraacetic acid) | BAPTA; |
| ethylene glycol tetraacetic acid | EGTA |
| nitrilotriacetic acid | NTA; |
| hydroxyethylimnodiacetic acid | HEIDA |
| hydroxyethylethylenediaminetetraacetic acid | HEDTA; |
| diethylenetriamine-pentaacetic acid | DTPA; |
| propyldiaminetetraacetic acid | PDTA; |
| L-glutamic acid N,N-diacetic acid | GLDA, GL, GANNDA; |
| cycloheylenediaminetetraacetic acid | CyDTA; |
| aminopolymethylenephosphonic acids; | |
| ethanoldiglycine | EDG; |
| malic acid; | |
| tartaric acid; | |
| citric acid; and | |
| whole and/or partial salts of the following acids. | |

Where the chelating agent is a salt of an organic acid, the salt may comprise any combination of one or more of the free acids and one or more Group 1-15 ions, preferably Group 1 metal ions and/or an ion comprising a Group 15 atom (e.g., an ammonium ion), preferably lithium ions, sodium ions, potassium ions, and/or ammonium ions. Thus, an illustrative salt of an organic acid may be the tripotassium salt of EDTA.

The chelating agent is preferably present within the fluid loss control agent at about 1 wt %, to about 50 wt %, based on the total weight of the fluid loss control agent. Within this range, the concentration of the chelating agent is preferably greater than or equal to about 5 wt %, preferably greater than or equal to about 10 wt %, with greater than or equal to about 20 wt % being still more preferred. Also within this range, the concentration of the chelating agent is preferably less than or equal to about 40 wt %, preferably less than or equal to about 30 wt %, with less than or equal to about 25 wt % being still more preferred.

Viscosity Increasing Agent

The instant fluid loss control agent further includes a viscosity increasing agent, which increases the viscosity of the fluid loss control agent relative to the identical fluid loss control agent in the absence of the viscosity increasing agent. Applicants have discovered that by controlling the viscosity of the fluid loss control agent through both the selection and the concentration of the viscosity increasing agent, the solubilizing period of time may be controlled and thus, the build up and subsequent removal of the filter cake may be controlled.

Suitable viscosity increasing agents, also referred to as "vicosifiers" for use herein include chemical species which are soluble, at least partially soluble, and/or insoluble in the fluid loss control agent. The viscosifiers may also include various insoluble or partially soluble organic and/or inorganic fibers and/or particulates, e.g., dispersed clay, dispersed minerals, and the like, which are known in the art to increase viscosity. Suitable vicosifiers further include various organic and/or inorganic polymeric species including polymer viscosifiers, especially metal-crosslinked polymers. Suitable polymers for making the metal-crosslinked polymer viscosifiers include, for example, polysaccharides e.g., substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents which include boron, titanium, zirconium and/or aluminum complexes are preferably used to increase the effective molecular weight of the polymer and make them better suited for use as viscosity increasing agents, especially in high-temperature wells.

Other suitable classes of water-soluble polymers effective as viscosifiers include polyvinyl alcohols at various levels of hydrolysis, polyvinyl polymers, polymethacrylamides, cellulose ethers, lignosulfonates, and ammonium, alkali metal, and alkaline earth salts thereof. More specific examples of other typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

In embodiments disclosed herein, cellulose derivatives are used, including hydroxyethylcellulose (HEC), hydroxypropylcellulose (HPC), carboxymethylhydroxyethylcellulose (CMHEC), and/or carboxymethycellulose (CMC), with or without crosslinkers. Xanthan, diutan, and scleroglucan, are also preferred.

In addition to cross-linked polymers, linear polymer systems may be used. Boron crosslinked polymers systems may be used including guar and substituted guars crosslinked with boric acid, sodium tetraborate, and encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines, and carboxylates such as acetates and oxalates) and with delay agents such as sorbitol, aldehydes, and sodium gluconate. Suitable zirconium cross-linked polymer systems include polymers crosslinked with zirconium lactates (for example sodium zirconium lactate), triethanolamines, 2,2'-iminodiethanol, and with mixtures of these ligands, including when adjusted with bicarbonate. Suitable titanates include by non-limiting example, lactates and triethanolamines, and mixtures, for example delayed with hydroxyacetic acid.

Other chemical additives known to increase viscosity may be used or included. Examples include various alcohols, e.g., isopropanol, n-propanol, methanol and/or the like, and/or hydrocarbons e.g., diesel oil.

The viscosity increasing agent is preferably present within the fluid loss control agent at about 1 wt %, to about 50 wt %, based on the total weight of the fluid loss control agent. Within this range, the concentration of the viscosity increasing agent is preferably greater than or equal to about 5 wt %, preferably greater than or equal to about 10 wt %, with greater than or equal to about 20 wt % being still more preferred. Also within this range, the concentration of the viscosity increasing agent is preferably less than or equal to about 40 wt %, preferably less than or equal to about 30 wt %, with less than or equal to about 25 wt % being still more preferred.

Bridging Solid Particles

The instant fluid loss control agent further includes a plurality of at least partially insoluble bridging solid particles dispersed within the well bore fluid. The chelating agent present in the fluid loss control agent is effective to at least partially solubilize at least a portion of the bridging solid particles over a solubilizing period of time for thereafter substantially dissolving the bridging solid particles. The bridging solid particles of the present disclosure may include inorganic compounds, typically salts and/or oxides. The bridging solids are preferably carbonates such as calcium carbonates, zinc carbonates, barium carbonates, and the like; metal oxides such as hematite, ilmenite, magnesium oxide, and the like; and/or particles such as barite, silica particles, clay particles, microspheres, hollow-microspheres, and the like, so long as the chelating agent present in the fluid loss control agent is effective to at least partially solubilize at least a portion of the bridging solid particles over a solubilizing period of time.

The bridging solids may further include hydrophobically coated or modified solid particles, wherein the hydrophobic coating is achieved by adsorption of substances onto the surface of a particle or molecule by physisorption or chemical reactions with reactive groups that are present on the surface of this particle or molecule. Examples for such substances are selected among fatty oils, fatty acids, fatty esters, carboxylated, sulfonated, sulfated, phosphonated hydrophobic material, surfactants that would generate a hydrophobic coating, organosilane grafting agents. Those substances introduce alkylsilyl groups or hydrocarbon groups like alkyl groups, especially of long chain onto the surface of the substrate. Coating processes or examples are described in WO9916834, EP0826414, U.S. Pat. No. 5,183,710, EP0606174.

The bridging solid particles preferably have an average size of about 0.5 to about 5,000 micrometers (μm) as determined according to methods known in the art. Within this range, the average size of the bridging solid particles is preferably greater than or equal to about 1 μm, preferably greater than or equal to about 10 μm, with greater than or equal to about 100 μm being still more preferred. Also within this range, the average size of the bridging solid particles is preferably less than or equal to about 2,000 μm, preferably less than or equal to about 1,000 μm, with less than or equal to about 500 μm being still more preferred.

The bridging solid particles are preferably present within the fluid loss control agent at about 1 wt %, to about 90 wt %, based on the total weight of the fluid loss control agent. Within this range, the concentration of the bridging solid particles is preferably greater than or equal to about 10 wt %, preferably greater than or equal to about 20 wt %, with greater than or equal to about 30 wt % being still more preferred. Also within this range, the concentration of the bridging solid particles is preferably less than or equal to about 80 wt %, preferably less than or equal to about 70 wt %, with less than or equal to about 60 wt % being still more preferred.

The fluid loss control agent described herein may have a density of about 8.9 lbs/gal to about 25 lbs/gal. Within this range, the density preferably greater than or equal to about 10 lbs/gal, preferably greater than or equal to about 15 lbs/gal, with greater than or equal to about 18 lbs/gal being still more preferred. Also within this range, the density is preferably less than or equal to about 20 lbs/gal, preferably less than or equal to about 19 lbs/gal, with less than or equal to about 18.5 lbs/gal being still more preferred.

Other Components of the Fluid Loss Control Agent

The fluid loss control agent may further include one or more surfactants and/or dispersants, as are commonly known in the art. Methods and fluids according to the present disclosure may include any surfactant for which its ability to aid the dispersion and/or stabilization of the gas component into the base fluid to form an energized fluid is readily apparent to those skilled in the art may be used. Viscoelastic surfactants, such as those described in U.S. Pat. No. 6,703,352 (Dahayanake et al.) and U.S. Pat. No. 6,482,866 (Dahayanake et al.), both incorporated herein by reference, are also suitable for use in fluids of the present disclosure. In some embodiments of the present disclosure, the surfactant is an ionic surfactant. Examples of suitable ionic surfactants include, but are not limited to, anionic surfactants such as alkyl carboxylates, alkyl ether carboxylates, alkyl sulfates, alkyl ether sulfates, alkyl sulfonates, alpha-olefin sulfonates, alkyl ether sulfates, alkyl phosphates and alkyl ether phosphates. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds.

Examples of suitable ionic surfactants also include, but are not limited to, surfactants that are usually regarded as zwitterionic surfactants and in some cases as amphoteric surfactants such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic), while a zwitterionic surfactant has a permanently positively charged moiety in the molecule regardless of pH and a negatively charged moiety at alkaline pH. In some embodiments of the present disclosure, the surfactant is a cationic, zwitterionic or amphoteric surfactant containing and amine group or a quaternary ammonium group in its chemical structure ("amine functional surfactant"). A particularly useful surfactant is the amphoteric alkyl amine contained in the surfactant solution AQUAT® 944 (available from Baker Petrolite of Sugar Land, Tex., 77478). In other embodiments of the present disclosure, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. When used, any effective amount of surfactant or blend of surfactants may be used, preferably the in an amount of about 0.02 wt % to about 10 wt % of total weight, and more preferably from about 0.05 wt % to about 5 wt % of total weight.

Friction reducers may also be incorporated into embodiments of the present disclosure. Any friction reducer may be used. Also, polymers such as polyacrylamide, polyisobutyl methacrylate, polymethyl methacrylate and polyisobutylene as well as water-soluble friction reducers such as guar gum, guar gum derivatives, polyacrylamide, and polyethylene oxide may be used. Commercial drag reducing chemicals such as those sold by Conoco Inc. under the trademark "CDR" as described in U.S. Pat. No. 3,692,676 (Culter et al.), incorporated herein by reference thereto, or drag reducers such as those sold by Chemlink designated under the trademarks "FLO 1003, 1004, 1005 & 1008" have also been found to be effective.

The aqueous medium used in embodiments of the present disclosure may be fresh water, salt water, seawater, natural or synthetic brine, or any other aqueous liquid that does not adversely react with the other components of the fluid loss control agent to affect its performance. In those embodiments of the present disclosure where the aqueous medium is a brine, the brine is water comprising an inorganic salt or organic salt. Preferred inorganic salts include alkali metal halides, more preferably potassium chloride. The carrier brine phase may also comprise an organic salt more preferably sodium or potassium formate. Preferred inorganic divalent salts include calcium halides, more preferably calcium chloride or calcium bromide. Sodium bromide, potassium bromide, or cesium bromide may also be used. The salt is chosen for compatibility reasons i.e. where the reservoir drilling fluid used a particular brine phase and the completion/clean up fluid brine phase is chosen to have the same brine phase.

Accordingly, suitable brines include KCl, NaCl, NaBr, $CaCl_2$, $CaBr_2$, and $CaCl_2/CaBr_2$ brines. A wide range of brine densities (from about 9 to about 14.8 lbm gallon) can be used. Other suitable brines include $NH_4Cl$, $MgCl_2$ and/or $ZnBr_2$ brines and seawater.

A fiber component may be included in fluids useful in embodiments of the present disclosure, to achieve a variety of properties including improving particle suspension, and particle transport capabilities, and gas phase stability. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the present disclosure, the fiber component may be include at concentrations from about 1 to about 15 grams per liter of the composition, preferably the concentration of fibers are from about 2 to about 12 grams per liter of composition, and more preferably from about 2 to about 10 grams per liter of composition.

Other additives and chemicals, known by those skilled in the art to be commonly used in oilfield applications, may be used in the present disclosure. These include, but are not necessarily limited to, materials such as surfactants, breaker aids, oxygen scavengers, alcohols, scale inhibitors, corrosion inhibitors, fluid-loss additives, bactericides, and the like. Also, they may include a co-surfactant to optimize viscosity or to minimize the formation of stable emulsions that contain components of crude oil or a polysaccharide or chemically modified polysaccharide, another polymer such as cellulose, derivatized cellulose, guar gum, derivatized guar gum, xanthan gum, or synthetic polymers such as polyacrylamides and polyacrylamide copolymers, and biocides such as 2,2-dibromo-3-nitrilopropionamine.

The instant fluid loss control agent may be utilized in during various operations related to well boring including, hydraulic fracturing, gravel packing, generally drilling fluids, wellbore cleanout fluids, fluid loss control fluids, kill fluids, spacers, flushes, pushers, and/or carriers for materials such as scale, paraffin, and asphaltene inhibitors.

pH Control

The pH of the fluid loss control agent may be used to control the solubilizing period of time. The pH of the fluid loss control agent may be controlled by inclusion of various pH control agents. Suitable pH control agents include sodium, potassium and ammonium sesquicarbonates, oxalates, carbonates, hydroxides, bicarbonates, and organic carboxylates such as acetates and polyacetates. Examples include sodium sesquicarbonate, sodium carbonate, and sodium hydroxide. Soluble oxides, including slowly soluble oxides such as MgO, may also be used. Amines and oligomeric amines, such as alkyl amines, hydroxyalkyl amines, anilines, pyridines, pyrimidines, quinolines, and pyrrolidines for example triethanolamine and tetraethylenepentamine, may also be used. The choice of pH control agent depends in part upon the solubilizing period of time desired, the chelating agent used, the concentration and/or composition of the viscosity increasing agent used, and/or the composition and/or concentration of the bridging solid particles used.

The pH of the instant fluid loss control agent is greater than or equal to about 1 and less than or equal to about 14. Within this range, the pH of the fluid loss control agent is preferably greater than or equal to about 2, preferably greater than or equal to about 3, preferably greater than or equal to about 4, preferably greater than or equal to about 5, preferably greater than or equal to about 6, preferably greater than or equal to about 7. Also within this range, the pH is preferably less than or equal to about 12, preferably less than or equal to about 11, preferably less than or equal to about 10, preferably less than or equal to about 9, preferably less than or equal to about 8, preferably less than or equal to about 7.5.

In an embodiment, the pH is about 2 to about 4.5. In another embodiment the pH is about 6 to 8. In still another embodiment, the pH is about 7.5 to about 9.

Fluid Loss Control

The instant fluid loss control agent may be used to minimize and/or eliminate fluid loss as part of an otherwise conventional drilling fluid or as a fluid loss control pill. As noted above, the concentration and composition of the chelating agent, the concentration and composition of the viscosity increasing agent, the concentration and composition of the bridging solid particles, and/or the pH of the fluid loss control agent, among other variables, allows for controlling the time in which the solid bridging particles remain at a particular size and concentration. Control of these parameters enables the use of the instant fluid loss control agent as a fluid loss control pill and/or as a temporary formation seal. The bridging solid particles at the face of the formation are preferably sized to form a filter cake preventing fluid from entering or leaving the porous medium. The cake formation either way effectively controls fluid loss. The clean-up mechanism of the formation seal is based on the solubilization of the bridging solid particles by the chelating agent over the solubilizing period of time.

Although there is not universal agreement on the precise relationship of particle size, pore dimension, and bridging, the following guidelines are used herein. Particles having diameters greater than about one-third (although some researchers say up to one half) of a pore throat diameter are expected to bridge at or near the formation face. Particles smaller than that but larger than about one-seventh of a pore throat diameter are expected to enter the formation and be trapped and form an internal filter cake. Particles smaller than about one-seventh of a pore throat diameter are expected to pass through the formation without substantially affecting flow. It is to be understood that there are other important factors such as distributions of particle and pore sizes, flow rate, particle concentration, and particle shape.

The solubilizing period of time is about 1 (hour) to about 1 week or more, as determined from the time the fluid loss control agent (pill) is spotted, to the time when fluid flow returns to 90% to 100% of normal fluid flow. Within this range, the solubilizing period of time is preferably greater than or equal to about 8 hrs, preferably greater than or equal to about 16 hrs, with greater than or equal to about 24 hrs being still more preferred. Also within this range, the solubilizing period of time is preferably less than or equal to about 72 hrs, preferably less than or equal to about 48 hrs, with less than or equal to about 36 hrs being still more preferred. Of course, the solubilizing period of time is dependent on the operation being performed in the well. The solubilizing period of time may thus be adjusted as disclosed herein to provide a fluid flow return of 90% to 100% of normal fluid flow at a time as dictated by the particular wellbore applications or treatments being performed.

Method of Treating a Well

Well treatment methods according to the instant disclosure comprises the steps of spotting a well with a fluid loss control agent e.g., a fluid loss control pill comprising a chelating agent, a viscosity increasing agent, and a plurality of at least partially insoluble bridging solid particles dispersed therein, wherein the chelating agent is effective to at least partially solubilize at least a portion of the bridging solid particles over a solubilizing period of time for thereafter substantially dissolving the bridging solid particles, wherein the solubilizing period of time is controlled by the concentration of the viscosity increasing agent, the concentration of the chelating agent, the composition of the metal salt, the pH of the fluid loss control agent, or a combination thereof.

EXAMPLES

The following examples describe embodiments of the instant disclosure and are offered for evidentiary purposes and are not intended to further limit the scope of the instant disclosure.

The following components were used in preparing the samples:

An Inventive Sample and a Comparative Sample were prepared to have 15 wt % Bridging solids. The samples were prepared as follows:

|  | Example | Comparative Example |
| --- | --- | --- |
| KCl | 8.65 | 8.65 |
| Fresh Water | 8.334 | 8.334 |
| KCl | 8.72 | 8.72 |
| 10.24 NaBr | 10.24 | 10.24 |
| Carbonate | 23.0852 | 23.0852 |
| SAPP | 10.8342 | 10.8342 |
| KOH (to ph of 5) | 17.0014 | 17.0014 |
| FLO-TROL | 12.5010 | 12.5010 |
| EGMBE | 7.5423 | 7.5423 |
| DSTRUCTOR | 9.5841 | 9.5841 |
| ECF-1 986 | 10.8342 | 10.8342 |
| SAFE-VIS OGS | 8.8340 | 8.8340 |
| DSPERSE | 8.1673 | 8.1673 |
| ECF-683 | 16.6680 | 16.6680 |
| FV NT | 12.5010 | 12.5010 |
| ECF-979 | 8.1257 | 8.1257 |

The base brine was prepared using 133.8 g dry NaCl and 208.1 g ECF-1761

It should be understood, of course, that the foregoing relates to preferred embodiments of the present disclosure and that modifications may be made without departing from the spirit and scope of the present disclosure as set forth in the following claims.

What is claimed is:

1. A well treatment method, comprising: spotting into a well a single mixture of a fluid loss control agent comprising a chelating agent, a viscosity increasing agent, and a plurality of at least partially insoluble bridging solid particles dispersed therein, wherein the chelating agent, the viscosity increasing agent and the plurality of at least partially insoluble bridging solid particles form a filter cake, wherein the bridging solid particles comprise a metal and are present in the fluid loss control agent in an amount that is at least 10 wt % based on the total weight of the fluid loss control agent, wherein the chelating agent which is present in an amount that is at least 5 wt % based on the total weight of the fluid loss control agent partially solubilizes at least a portion of the bridging solid particles over a period of time, thereby allowing removal of the treatment fluid and filter cake after solubilizing the bridging solid particles.

2. The well treatment method of claim 1 wherein the chelating agent is selected from the group consisting of ethylenediamine tetra acetic acid, 1,2-bis(o-aminophenoxy) ethane-N,N,N',N'-tetraacetic acid), ethylene glycol tetraacetic acid, nitrilotriacetic acid, hydroxyethylimnodiacetic acid, hydroxyethylethylenediaminetetraacetic acid, diethylenetriamine-pentaacetic acid, propyldiaminetetraacetic acid, L-glutamic acid N,N-diacetic acid, cycloheylenediaminetetraacetic acid, aminopolymethylenephosphonic acids, ethanoldiglycine, malic acid, whole and/or partial salts of the following acids, and combinations thereof.

3. The well treatment method of claim 1 wherein the chelating agent is $K_3$EDTA.

4. The well treatment method of claim 1, wherein the pH of the fluid loss control agent is less than 7.

5. The well treatment method of claim 1, wherein the pH of the fluid loss control agent is greater than 7.

6. A fluid loss control agent comprising a chelating agent, a viscosity increasing agent, and a plurality of at least partially insoluble bridging solid particles dispersed therein, wherein the bridging solid particles comprise a metal and are present in the fluid loss control agent in an amount that is at least 10 wt % based on the total weight of the fluid loss control agent, wherein the chelating agent which is present in an amount that is at least 5 wt % based on the total weight of the fluid loss control agent partially solubilizes at least a portion of the bridging solid particles over a period of time, wherein the at least partially insoluble bridging solid particles are selected from the group of carbonates, barite, silica particles, clay particles, microspheres, hollow-microspheres and combinations thereof and wherein the chelating agent is selected from the group consisting of ethylenediamine tetra acetic acid, 1,2-bis(o-aminophenoxy) ethane-N,N,N',N'-tetraacetic acid), ethylene glycol tetraacetic acid, nitrilotriacetic acid, hydroxyethylimnodiacetic acid, hydroxyethylethylenediaminetetraacetic acid, diethylenetriamine-pentaacetic acid, propyldiaminetetraacetic acid, L-glutamic acid N,N-diacetic acid, cycloheylenediaminetetraacetic acid, aminopolymethylenephosphonic acids, ethanoldiglycine, malic acid, whole and/or partial salts of the following acids, and combinations thereof.

7. The fluid loss control agent of claim 6, wherein the chelating agent is $K_3$EDTA.

8. The fluid loss control agent of claim 6, wherein the pH of the fluid loss control agent is less than 7.

9. The fluid loss control agent of claim 6, wherein the pH of the fluid loss control agent is greater than 7.

10. The wellbore treatment method of claim 1, wherein the at least partially insoluble bridging solid particles that form a filtercake on a face of the formation through which the well runs have an average size of at least 0.5µ.

11. The wellbore treatment method of claim 1, wherein a solubilizing period of time is determined from when the fluid loss control agent is spotted to when fluid flow in a wellbore returns to about 90% to 100% of normal fluid flow.

12. The fluid loss control agent of claim 6, wherein a solubilizing period of time is determined from when the fluid loss control agent is spotted to when fluid flow in a wellbore returns to about 90% to 100% of normal fluid flow.

13. The well treatment method of claim 1, wherein the at least partially insoluble bridging solid particles are selected from the group of carbonates, barite, silica particles, clay particles, microspheres, hollow-microspheres and combinations thereof.

* * * * *